United States Patent
Hasegawa et al.

(10) Patent No.: US 6,649,133 B1
(45) Date of Patent: Nov. 18, 2003

(54) CATALYST FOR PURIFYING EXHAUST GAS, PROCESS FOR PRODUCING THE SAME, AND METHOD FOR PURIFYING EXHAUST GAS

(75) Inventors: Yoriko Hasegawa, Aichi-ken (JP); Mareo Kimura, Aichi-ken (JP); Naoki Takahashi, Aichi-ken (JP); Hiromasa Suzuki, Kasugai (JP); Riemi Tanizawa, Toyota (JP); Kazuaki Sobue, Toyota (JP)

(73) Assignees: Toyota Jidosha Kabushiki Kaisha, Toyota (JP); Kabushiki Kaisha Toyota Chuo Kenkyusho, Nagakute-cho (JP)

( * ) Notice: Subject to any disclaimer, the term of this patent is extended or adjusted under 35 U.S.C. 154(b) by 0 days.

(21) Appl. No.: 09/581,938
(22) PCT Filed: Dec. 22, 1998
(86) PCT No.: PCT/JP98/05791
§ 371 (c)(1), (2), (4) Date: Aug. 11, 2000
(87) PCT Pub. No.: WO99/33560
PCT Pub. Date: Jul. 8, 1999

(30) Foreign Application Priority Data

Dec. 26, 1997 (JP) .............................. 9-359690

(51) Int. Cl.$^7$ .............................. B01D 53/56
(52) U.S. Cl. ............ 423/239.1; 502/303; 502/304; 502/325; 502/328; 502/340; 502/349; 502/350
(58) Field of Search ............ 423/239.1; 502/303, 502/304, 325, 328, 340, 349, 350

(56) References Cited

U.S. PATENT DOCUMENTS 4,350,613 A 9/1982 Nishino et al. ........ 252/455 R

FOREIGN PATENT DOCUMENTS

| | | | |
|---|---|---|---|
| EP | A1 0 657 204 | 6/1995 | ........... B01D/53/94 |
| JP | 56-126446 | 10/1981 | |
| JP | 57-127444 | 8/1982 | ........... B01J/21/10 |
| JP | 62-256757 | 11/1987 | ........... C04B/35/10 |
| JP | 02-172536 | 7/1990 | |
| JP | 06-327945 | 11/1994 | ........... B01D/53/36 |
| JP | 7-256105 | 10/1995 | ........... B01J/23/63 |
| JP | 08-099034 | 4/1996 | ........... B01J/23/40 |
| JP | 8-192051 | 7/1996 | ........... B01J/23/58 |
| JP | 08-224469 | 9/1996 | |
| JP | 9-85053 | 3/1997 | ........... B01D/53/86 |
| JP | 09-173839 | 7/1997 | |
| JP | 10-211431 | 8/1998 | ........... B01J/23/38 |
| JP | 11-036847 | 2/1999 | |
| JP | 11-076838 | 3/1999 | |
| JP | 2000-015101 | 1/2000 | |

*Primary Examiner*—Stanley S. Silverman
*Assistant Examiner*—Maribel Medina
(74) *Attorney, Agent, or Firm*—Oliff & Berridge, PLC

(57) ABSTRACT

A catalyst for purifying an exhaust gas includes a support including rutile titania, an $NO_x$ storage material including at least on element selected from alkali metals, alkaline-earth metals and rare-earth elements and loaded on the support, and a noble metal loaded on the support. Since the rutile $TiO_2$ and the $NO_x$ storage material form a fine composite oxide, the $NO_x$ storage material is likely to decompose even when it is subject to the sulfur poisoning, and the $NO_x$ storage material easily recovers the $NO_x$ storage ability. Therefore, the $NO_x$ storage material can be inhibited from the sulfur poisoning, and a high $NO_x$ conversion ratio can be maintained even after the service at an elevated temperature.

14 Claims, 1 Drawing Sheet

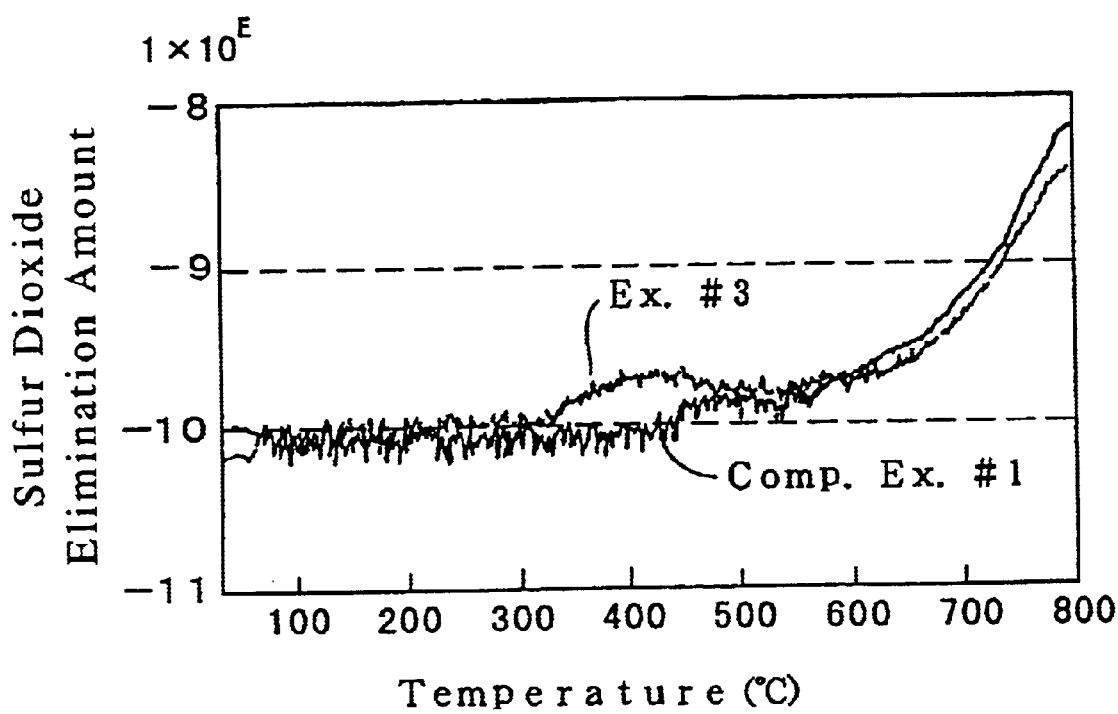

CATALYST FOR PURIFYING EXHAUST GAS, PROCESS FOR PRODUCING THE SAME, AND METHOD FOR PURIFYING EXHAUST GAS

TECHNICAL FIELD

The present invention relates to a catalyst for purifying an exhaust gas, a process for producing the same, and a method using the catalyst for purifying an exhaust gas, particularly, to a catalyst which can efficiently purify nitrogen oxides ($NO_x$) in an exhaust gas which contains oxygen excessively in an amount more than necessary for oxidizing carbon monoxide (CO) and hydrocarbons (HC) which are contained in the exhaust gas, a process for producing the same and a method for purifying the exhaust gas.

BACKGROUND ART

Conventionally, as a catalyst for purifying an automobile exhaust gas, a 3-way catalyst has been employed which carries out the oxidation of CO and HC and the reduction of $NO_x$ simultaneously to purify an exhaust gas. With regard to such a catalyst, for example, a catalyst has been known widely in which a loading layer comprising γ-alumina is formed on a heat-resistant support, such as cordierite, and a noble metal, such as Pt, Pd and Rh, is loaded on the loading layer.

By the way, the purifying performance of such a catalyst for purifying an exhaust gas depends greatly on the air-fuel ratio (A/F) of an engine. For example, when the air-fuel ratio is large, namely on a lean side where the fuel concentration is lean, the oxygen amount in the exhaust gas increases so that the oxidation reactions of purifying CO and HC are active, on the other hand, the reduction reactions of purifying $NO_x$ are inactive. Conversely, for example, when the air-fuel ratio is small, namely on a rich side where the fuel concentration is high, the oxygen amount in the exhaust gas decreases so that the oxidation reactions are inactive and the reduction reactions are active.

Whilst, in automobile driving, in the case of urban driving, the acceleration and deceleration are carried out frequently so that the air-fuel ratio varies frequently within the range of from adjacent to the stoichiometric point (ideal air-fuel ratio) to the rich state. In order to cope with the low fuel consumption requirement in such driving, a lean-side driving is needed in which a mixture containing oxygen as excessive as possible is supplied. Therefore, it is desired to develop a catalyst which can fully purify $NO_x$ on the lean side as well.

Hence, an $NO_x$-storage and reduction type catalyst has been proposed in which an alkaline-earth metal and Pt are loaded on a porous support, such as alumina (Japanese Unexamined Patent Publication (KOKAI) No. 5-317,652, etc.). In accordance with this catalyst, since the $NO_x$ are absorbed in the alkaline-earth metal, serving as the $NO_x$ storage material, and since they are reacted with a reducing gas, such as HC, and are purified, it is good in the purifying performance of $NO_x$ even on the lean side.

In the catalyst disclosed in Japanese Unexamined Patent Publication (KOKAI) No. 5-317,652, it is believed that barium, for example, is loaded as the carbonate, and the like, on the support, and it reacts with $NO_x$ to generate barium nitrate ($Ba(NO_3)_2$), thereby storing the $NO_x$.

That is, in the above-described $NO_x$-storage and reduction type catalyst, by controlling the air-fuel ratio from the lean side to the stoichiometric point and to the rich side in a pulsating manner, the $NO_x$ are stored in the $NO_x$ storage material on the lean side. And, the stored $NO_x$ are released at the stoichiometric point and on the rich side, are reacted with the reducing components, such as HC and CO, by the catalytic action of Pt, and are thereby purified. Therefore, since the emission of the $NO_x$ is inhibited even on the lean side, a high $NO_x$ purifying ability is exhibited as a whole.

In addition, it is understood that the purifying reaction of the $NO_x$ in the $NO_x$-storage and reduction type catalyst comprises a first step of oxidizing NO in an exhaust gas to $NO_x$, a second step of storing the $NO_x$ on the $NO_x$ storage material, and a third step of reducing $NO_x$, which are emitted from the $NO_x$ storage material, on the catalyst.

However, in the exhaust gas, $SO_2$ is contained which is generated by burning sulfur (S) contained in the fuel, it is further oxidized to $SO_x$, such as $SO_3$, by the catalytic metal in an oxygen-rich atmosphere. Then, they are easily turned into sulfuric acid by the water vapor contained in the exhaust gas, and they are reacted with the barium, etc., to generate sulfites and sulfates, and it is understood that the $NO_x$ storage material is thus poisoned and degraded. This phenomenon is referred to as sulfur poisoning. Moreover, the porous support, such as alumina, has a property that it is likely to absorb the $SO_x$, and there is a problem in that the aforementioned sulfur poisoning is facilitated.

And, when the $NO_x$ storage material is turned into the sulfites and the sulfates, it cannot store the $NO_x$ any more, and, as a result, there is a drawback in the aforementioned catalyst in that the $NO_x$ purifying ability decreases gradually in the service.

Moreover, since titania ($TiO_2$) does not absorb $SO_2$ it was thought of using a $TiO_2$ support, and an experiment was carried out. As a result, $SO_2$ was not absorbed by the $TiO_2$ and flowed downstream as it was, since only the $SO_2$, which contacted directly with the catalytic noble metal, was oxidized, it was revealed that the sulfur poisoning occurred to a lesser extent. However, when the $TiO_2$ support is employed, the initial activity was low, and it was revealed that there was a critical drawback in that the $NO_x$ purifying performance was kept low after durability.

Hence, in Japanese Unexamined Patent Publication (KOKAI) No. 6-327,945, it is proposed to use a support in which alumina is mixed with a composite oxide, such as a Ba—Ce composite oxide and a Ba—Ce—Nb composite oxide. In addition, in Japanese Unexamined Patent Publication (KOKAI) No. 8-99,034, it is proposed to use at least one composite support selected from the group consisting of $TiO_2$-$Al_2O_3$, $ZrO_2$—$Al_2O_3$ and $SiO_2$—$Al_2O_3$. By thus using the support in which the composite oxide is mixed, or by using the composite support, the $NO_x$ storage material is inhibited from the sulfur poisoning, and the $NO_x$ purifying ability after durability is improved.

However, since the recent increase of the high-speed driving, the improvement in the engine performance, and the regulation of the exhaust gas accompany the highly elevated exhaust-gas temperature, the exhaust-gas purifying catalyst is required to exhibit a further enhanced heat resistance.

The present invention has been developed in view of the aforementioned circumstances, and it is a primary object of the present invention to enable the $NO_x$ storage material to be further inhibited from the sulfur poisoning, and to be capable of keeping a high $NO_x$ conversion ratio even after the service at an elevated temperature.

DISCLOSURE OF INVENTION

A characteristic of a catalyst for purifying an exhaust gas according to the present invention, solving the aforementioned assignments, is that the catalyst, which is of an $NO_x$ storage-and-reduction type, and disposed in an exhaust gas of an oxygen-rich atmosphere made by burning an air-fuel mixture whose air-fuel ratio, A/F (air/fuel), is 18 or more, so that $NO_x$ in the exhaust gas is stored therein, and whose air-fuel ratio is perturbed from the stoichiometric point to a fuel-rich atmosphere periodically so that the $NO_x$ stored therein is released therefrom, thereby carrying out reducing and purifying, comprises: a support including rutile type titania; an $NO_x$ storage material including at least one element selected from the group consisting of alkali metals, alkaline-earth metals and rare-earth elements and loaded on the support; and a noble metal loaded on the support.

A characteristic of a process for manufacturing a catalyst for purifying an exhaust gas according to the present invention is that the process comprises the steps of: heat-treating by contacting a rutile type titania source with an $NO_x$ storage material source including at least one element selected from the group consisting of alkali metals, alkaline-earth metal and rare-earth elements and by heat-treating them at 500–1,000° C., thereby forming a composite oxide powder of rutile type titania and an $NO_x$ storage material; mixing the composite oxide powder and an alumina powder, thereby making a support powder; and loading a noble metal on the support powder.

Moreover, a characteristic of a method for purifying an exhaust gas according to the present invention is that a catalyst, comprising a support including rutile type titania, an $NO_x$ storage material including at least one element selected from the group consisting of alkali metals, alkaline-earth metals and rare-earth elements and loaded on the support, and a noble metal loaded on the support, is disposed in an exhaust gas of an oxygen-rich atmosphere made by burning an air-fuel mixture whose air-fuel ratio, A/F (air/fuel), is 18 or more so that $NO_x$ in the exhaust gas are stored in the $NO_x$ storage material, and whose air-fuel ratio is perturbed from the stoichiometric point to a fuel-rich atmosphere periodically so that the $NO_x$ stored in the $NO_x$ storage material are released, thereby carrying out reducing and purifying.

BRIEF DESCRIPTION OF DRAWING

The FIGURE is a graph for showing the results of a Temperature Programed Reduction and elimination test on exhaust-gas purifying catalysts of Example No. 3 and Comparative Example No. 1, and illustrates the relationship between temperatures and amounts of eliminated sulfur.

BEST MODE FOR CARRYING OUT THE INVENTION

Titania ($TiO_2$) reacts with an $NO_x$ storage material to form a composite oxide (e.g., $BaTiO_3$, etc.) partially at least. And, according to the study carried out by the inventors of the present invention, composite oxides generated by the reaction of anatase type $TiO_2$ and an $NO_x$ storage material became coarse particles, however, it was revealed that particle diameters of generating composite oxides composed of $TiO_2$ and an $NO_x$ storage material became extremely fine when rutile type $TiO_2$ was used.

And, when these composite oxides are used as a support, since the particle diameters are fine and the specific surface areas are large when the $NO_x$ storage material in the composite oxides is subjected to the sulfur poisoning, the decompositions of the sulfates and the sulfites are facilitated even at a low temperature, it is believed that the $NO_x$ storage material quickly recovers the $NO_x$ storing function. Therefore, the catalyst is good in terms of the sulfur poisoning resistance, and can keep a high $NO_x$ conversion ratio even after the service at an elevated temperature.

Whilst, in the anatase type $TiO_2$, the decomposition reactions of the sulfates and the sulfites are slow, and the decomposition reactions of the sulfates and the sulfites in a low temperature range are inferior to the rutile type. Moreover, the rutile type is better than the anatase type in terms of the dispersibility of a noble metal, the reason is not clear, however, it is revealed that the rutile type is less than the anatase type in terms of the sulfur poisoning extent. Therefore, in the present invention, the rutile type $TiO_2$ is used.

Besides, in a support in which an $NO_x$ storage material is loaded on the rutile type $TiO_2$, there is a case where the composite oxides of the rutile type $TiO_2$ and the $NO_x$ storage material do not exist initially. However, in the service as an exhaust-gas purifying catalyst or in a durability test, the composite oxides of the rutile type $TiO_2$ and the $NO_x$ storage material are generated partially at least. Moreover, it is possible to include the composite oxides of the rutile type $TiO_2$ and the $NO_x$ storage material, which are formed in advance, in the support. In this case, all of the support can be formed of the composite oxides of the rutile type $TiO_2$ and the $NO_x$ storage material, or it is possible to make a support, a part of which contains the composite oxides of the rutile type $TiO_2$ and the $NO_x$ storage material.

A particle diameter of the rutile type $TiO_2$ can preferably fall in the range of 15–100 nm. When the particle diameter of the rutile type $TiO_2$ is less than 15 nm, the particles of the composite oxides become coarse and the decomposition of the $NO_x$ storage material, which is subjected to the sulfur poisoning, is hindered, because the whole particles react with the $NO_x$ storage material. Moreover, when the particle diameter of the rutile type $TiO_2$ exceeds 100 nm, it is difficult to decompose the $NO_x$ storage material, which is subjected to the sulfur poisoning, because the generating amount of the composite oxides composed of the rutile type $TiO_2$ and the $NO_x$ storage material decreases. Therefore, when falling outside the aforementioned range, an $NO_x$ conversion ratio decreases after the service at a high temperature in both of the cases.

The composite oxides of the rutile type titania and the $NO_x$ storage material can be present in at least a part of the rutile type titania and the $NO_x$ storage material, or the rutile type titania and the $NO_x$ storage material can be made into the composite oxides as a whole.

It is possible to actively form the composite oxides of the rutile type $TiO_2$ and the $NO_x$ storage material by contacting a rutile type $TiO_2$ source and an $NO_x$ storage material source and heat-treating them at 500–1,000° C. When this temperature is less than 500° C., it is difficult to generate the composite oxides, and when it exceeds 1,000° C., the formed composite oxides grow granularly to decrease an $NO_x$ conversion ratio. It is especially preferable to heat-treat them at 600–800° C. for 1–3 hours. In addition, the heat treatment can be carried out in the manufacturing of the catalyst, or can be carried out by a heat of an exhaust gas in the service as an exhaust-gas purifying catalyst.

As the rutile type $TiO_2$ source, the rutile type $TiO_2$ can be used as it is, or Ti compounds which are turned into the rutile type $TiO_2$ by the aforementioned heat treatment. Moreover, as the $NO_x$ storage material source, it is possible to use compounds, such as acetates, nitrates and hydroxides, of at least one element selected from the group consisting of alkali metals, alkaline-earth metals and rare-earth elements.

In addition, in the support of the exhaust-gas purifying catalyst according to the present invention, it is possible to include a porous substance of good gas-adsorbing ability, such as alumina, silica, zirconia and silica-alumina, and it is preferred that these porous substances are mixed with the rutile type $TiO_2$ to use. By means of this, the purifying performance is further improved.

Moreover, when the porous substance and the rutile type $TiO_2$ are mixed to make a support, it is preferred that the $NO_x$ storage material is loaded on the rutile type $TiO_2$. By means of this, the generation of the composite oxides is made further easy, and the sulfur poisoning of the $NO_x$ storage material is further inhibited.

As the $NO_x$ storage material, at least one element is selected from the group consisting of alkali metals, alkaline-earth metals and rare-earth elements, and, as the alkali metals, lithium, sodium, potassium, rubidium, cesium and francium can be listed. The alkaline-earth metals are referred to as the elements of group IIA in the periodic table of the elements, and barium, beryllium, magnesium, calcium and strontium can be listed. Moreover, as the rare-earth elements, scandium, yttrium, lanthanum, cerium, praseodymium and neodymium can be exemplified.

A ratio of the rutile type $TiO_2$ and the $NO_x$ storage material can preferably fall in the range of the $NO_x$ storage material/the $TiO_2$=1/9–7/3 by molar ratio, especially preferably fall in the range of 2/8–6/4 by molar ratio. When the amount of the $NO_x$ storage material is smaller than this range, a sufficient $NO_x$ purifying ability cannot be obtained, when the amount of the $NO_x$ storage material is larger than this range, the purifying activity decreases because the $NO_x$ storage material covers the surface of a loaded noble metal. In addition, there also arises a drawback in that the sintering of the noble metal is promoted.

As the noble metal, one of Pt, Rh and Pd, or a plurality of them can be used. The loading amount, in the case of Pt and Pd, can preferably be 0.1–20.0 g, especially preferably be 0.5–10.0 g, with respect to 120 g of the support. Moreover, in the case of Rh, it can preferably be 0.01–10 g, especially preferably be 0.05–5.0 g, with respect to 100 g of the support.

In manufacturing the exhaust-gas purifying catalyst according to the present invention, for example, it can be manufactured by mixing and heating the $NO_x$ storage material and the rutile type $TiO_2$ to 500° C. or more to make at least a part of them into the composite oxides, by mixing the composite oxides with alumina, or the like, and thereafter by loading the noble metal.

In addition, it can be manufactured by mixing the rutile type $TiO_2$, on which the $NO_x$ storage material is loaded, with alumina, or the like, on which the noble metal is loaded. In this case, it is possible to form the composite oxides by a heat of an exhaust gas in the service.

And, in accordance with the present invention, the exhaust-gas purifying catalyst is good in terms of the sulfur poisoning resistance, accordingly the sulfur poisoning of the $NO_x$ storage material is inhibited in the service at an elevated temperature, by means of this, a high $NO_x$ conversion ratio can be secured even after the service at a high temperature.

Moreover, in accordance with the present invention, the process for manufacturing a catalyst for purifying an exhaust gas can stably and securely manufacture the aforementioned exhaust-gas purifying catalyst.

And, in the method for purifying an exhaust gas according to the present invention, the exhaust-gas purifying catalyst according to the present invention contacts with an exhaust gas of an oxygen-rich lean atmosphere, the $NO_x$ in the exhaust gas are thereby stored in the $NO_x$ storage material, the exhaust-gas atmosphere is made into from the stoichiometric point to a rich atmosphere by periodically perturbing the air-fuel ratio from the stoichiometric point to a fuel-rich atmosphere, the $NO_x$ stored in the $NO_x$ storage material are thereby released, and the $NO_x$ are reduced on the noble metal by the HC and CO in the exhaust gas.

By the way, in a lean atmosphere, the $SO_x$ in the exhaust gas react with the $NO_x$ storage material to generate the sulfates and the sulfites. However, the composite oxides are formed in at least a part of the $NO_x$ storage material and the rutile type $TiO_2$, and the particle diameters are extremely fine. Therefore, the specific surface areas are so large that the decompositions of the sulfates and the sulfites are accelerated even at a low temperature, and the $NO_x$ storage material quickly recovers the $NO_x$ storage function. By means of this, the sulfur poisoning of the $NO_x$ storage material is inhibited, and it is possible to stably purify the $NO_x$ in the exhaust gas, emitted from a lean-burn engine, at a high conversion ratio.

EXAMPLES

Hereinafter, the present invention will be described concretely with reference to examples and comparative examples.

Example No. 1

A barium acetate aqueous solution was impregnated into a rutile type $TiO_2$ powder whose particle diameter was 35 nm, was dried, and was thereafter calcined in air at 650° C. for 3 hours. The molar ratio Ba/Ti of the resulting $TiO_2$ powder loaded with Ba was 1/9, when this powder was analyzed by the x-ray diffraction, the peaks of $BaTiO_3$ and the rutile type $TiO_2$ were observed. Namely, Ba was loaded so that it formed a composite oxide with the rutile type $TiO_2$.

Next, 100 g of the aforementioned $TiO_2$ powder loaded with Ba and 100 g of $\gamma$—$Al_2O_3$ were mixed uniformly with a ball mill, a dinitrodiamine platinate aqueous solution having a predetermined concentration was impregnated into the resulting powder in a predetermined amount, was dried, and was thereafter calcined in air at 300° C. for 1 hour. The loading amount of Pt was 2% by weight by metallic Pt conversion.

The resulting catalyst powder was formed by pressing, thereby obtaining pelletized catalysts having a size of 0.5–1.0 mm.

Example No. 2

Except that the molar ratio Ba/Ti was varied to 3/7, pelletized catalysts of Example No. 2 were prepared in the same manner as Example No. 1. Note that, when the $TiO_2$ powder loaded with Ba was analyzed by the x-ray diffraction, the peaks of $BaTiO_3$, the rutile type $TiO_2$ and $BaCO_3$ were observed.

Example No. 3

Except that the molar ratio Ba/Ti was varied to 5/5, pelletized catalysts of Example No. 3 were prepared in the same manner as Example No. 1. Note that, when the $TiO_2$ powder loaded with Ba was analyzed by the x-ray diffraction, the peaks of $BaTiO_3$, the rutile type $TiO_2$ and $BaCO_3$ were observed.

Example No. 4

Except that the molar ratio Ba/Ti was varied to 7/3, pelletized catalysts of Example No. 4 were prepared in the same manner as Example No. 1. Note that, when the $TiO_2$ powder loaded with Ba was analyzed by the x-ray diffraction, the peaks of $BaTiO_3$, the rutile type $TiO_2$ and $BaCO_3$ were observed.

Example No. 5

Except that a mixture aqueous solution of barium acetate and potassium acetate was used instead of the barium acetate aqueous solution, and that a molar ratio Ba/K/Ti was 4/1/5, pelletized catalysts of Example No. 5 were prepared in the same manner as Example No. 1. Note that, when the $TiO_2$ powder loaded with Ba/K was analyzed by the x-ray diffraction, the peaks of $BaTiO_3$, the rutile type $TiO_2$ and $BaCO_3$ were observed.

Example No. 6

100 g of a rutile type $TiO_2$ powder whose particle diameter was 35 nm and 100 g of $\gamma$—$Al_2O_3$ were mixed uniformly with a ball mill, a barium acetate aqueous solution having a predetermined concentration was impregnated into the resulting support powder in a predetermined amount, and the support powder was dried, and was thereafter calcined in air at 650° C. for 3 hours. The loading amount of Ba was 0.2 mol with respect to 100 g of the support. When the resulting powder loaded with Ba was analyzed by the x-ray diffraction, the peaks of $BaTiO_3$, the rutile type $TiO_2$ and $BaCO_3$ were observed.

A dinitrodiamine platinate aqueous solution having a predetermined concentration was impregnated into this powder loaded with Ba in a predetermined amount, was dried, and was thereafter calcined in air at 300° C. for 1 hour. The loading amount of Pt was 2% by weight by metallic Pt conversion.

The resulting catalyst powder was formed by pressing, thereby obtaining pelletized catalysts having a size of 0.5–1.0 mm.

Comparative Example No. 1

Except that an anatase type $TiO_2$ powder whose particle diameter was 18 nm was used instead of the rutile type $TiO_2$ powder whose particle diameter was 35 nm, and that the molar ratio Ba/Ti of the $TiO_2$ powder loaded with Ba was varied to 5/5, pelletized catalysts of Comparative Example No. 1 were prepared in the same manner as Example No. 1. Note that, when the $TiO_2$ powder loaded with Ba was analyzed by the x-ray diffraction, the peaks of $BaTiO_3$, the anatase type $TiO_2$ and $BaCO_3$ were observed.

Comparative Example No. 2

Except that an anatase type $TiO_2$ powder whose particle diameter was 18 nm was used instead of the rutile type $TiO_2$ powder whose particle diameter was 35 nm, pelletized catalysts of Comparative Example No. 2 were prepared in the same manner as Example No. 6. Note that, when the powder loaded with Ba was analyzed by the x-ray diffraction, the peaks of $BaTiO_3$, the anatase type $TiO_2$ and $BaCO_3$ were observed.

Test

Two conditions of model gases, which simulated automobile engine emission gases and whose air-fuel ratios were A/F=18 and A/F=14, were circulated through each of the aforementioned pelletized catalysts at an inlet temperature of 300° C. at intervals of 2 minutes repeatedly, and $NO_x$ conversion ratios (initial $NO_x$ conversion ratios) were measured, respectively, in this instance. The results are set forth in Table 1.

Moreover, a model gas, which was equivalent to A/F=18 and which included $SO_2$ in a concentration of 300 ppm, was circulated in each of the pelletized catalysts at 600° C. for 20 hours, and thereafter a model gas, which was equivalent to A/F=14, was circulated at 600° C. for 30 minutes, thereby carrying out a durability test, and thereafter $NO_x$ conversion ratios ($NO_x$ conversion ratios after durability test) were measured, respectively, in the same by manner as the initial $NO_x$ conversion ratios. The results are set forth in Table 1.

TABLE 1

|  | $TiO_2$ | | Ba/K/Ti | $NO_x$ C.R.*1 (%) | | R.R.*2 of | P.D.*3 (nm) |
|---|---|---|---|---|---|---|---|
|  | C.S.*4 | P.D.*3 (nm) | M.R.*5 | Ini*6 | A.D.*7 | $NO_x$ C.R.*1 (%) | of BaTiO3 |
| Ex. #1 | Rutile | 35 | 1/0/9 | 60 | 54 | 90 | 16 |
| Ex. #2 | Rutile | 35 | 3/0/7 | 78 | 64 | 82 | 20 |
| Ex. #3 | Rutile | 35 | 5/0/5 | 75 | 66 | 88 | 19 |
| Ex. #4 | Rutiie | 35 | 7/0/3 | 65 | 48 | 74 | 20 |
| Ex. #5 | Rutile | 35 | 4/1/5 | 80 | 68 | 85 | 25 |
| Comp. Ex. #1 | Anatase | 18 | 5/0/5 | 74 | 45 | 61 | 37 |
| Ex. #6 | Rutile | 35 | — | 72 | 62 | 86 | 19 |
| Comp. Ex. #2 | Anatase | 18 | — | 70 | 56 | 80 | 30 |

*1denotes "$NO_x$ Conversion Ratio".
*2denotes "Retention Ratio".
*3denotes "Particle Diameter".
*4denotes "Crystal Structure".
*5denotes "Molar Ratio".
*6denotes "Initial".
*7denotes "After Durability".

Regarding the catalysts of Example No. 3 and Comparative Example No. 1, the dispersibility of Pt was investigated in both cases, initially and after the durability test, by the CO adsorption method. Moreover, by the microscopic observation, the particle diameter of loaded Pt was measured in both cases, initially and after the durability test. The results are set forth in Table 2.

TABLE 2

|  |  | $TiO_2$ | Pt D. *1 (%) | Pt P. D. *2 (nm) |
|---|---|---|---|---|
| Ex. #3 | Ini *3 | Rutile | 50 | 3 |
|  | A.D. *4 |  | 13 | 13 |
| Comp. Ex. #1 | Ini *3 | Anatase | 15 | 10 |
|  | A.D. *4 |  | 7 | 22 |

*1 denotes "Pt Dispersibility".
*2 denotes "Pt Particle Diameter".
*3 denotes "Initially".
*4 denotes "After Durability".

Further, concerning the catalysts of the examples and the comparative examples, the particle diameters of $BaTiO_3$ were measured by the x-ray diffraction, respectively, when they were in the initial states before they were subjected to the durability test. The results are also set forth in Table 1 collectively.

Furthermore, regarding the catalysts of Example No. 3 and Comparative Example No. 1, a durability test was carried out by circulating a model gas, which was equivalent to A/F=18 and which included sulfur in an amount of 50 ppm, at an inlet gas temperature of 550° C. for 2 hours. Then, the sulfur adhesion amounts were measured by a chemical analysis, and the results are set forth in Table 3.

TABLE 3

|  | $TiO_2$ | Sulfur Adhesion Amount (% by Weight) |
|---|---|---|
| Ex. #3 | Rutile | 0.2 |
| Comp. Ex. #1 | Anatase | 0.3 |

Moreover, concerning the catalysts of Example No. 3 and Comparative Example No. 1, in order to examine the elimination behavior of the adhered sulfur, the Temperature Programed Reduction was carried on the sulfur. The results are illustrated in the FIGURE.

It is understood from aforementioned Table 1 that the catalysts of Example Nos. 1 through 5 hold the retention ratios of the $NO_x$ conversion ratios higher than the catalysts of Comparative Example No. 1, and that they exhibited the high $NO_x$ purifying performances after the durability test. Moreover, it is the same when comparing Example No. 6 with Comparative Example No. 2.

On the other hand, it is appreciated from Table 3 that the adhering amount was less in the catalysts of Example No. 3, and it is seen from the FIGURE that the catalyst of Example No. 3 could release the sulfur from a low temperature of about 300° C.

Therefore, it is believed that the catalysts of examples exhibited the higher $NO_x$ conversion ratios than the catalysts of comparative examples even after the durability test because they were inhibited from the sulfur poisoning more than the catalysts of comparative examples. Moreover, it is supposed that the sulfur dioxide poisoning was inhibited because the particle diameters of $BaTiO_3$ were so fine that the sulfates were likely to decompose. Therefore, it is understood from Table 1 that the particle diameter of $BaTiO_3$ can preferably fall in the range of 15–25 nm.

In addition, according to Table 2, loading Pt as fine particles and in a highly dispersed manner is one of the reasons that the catalysts of examples exhibited the excellent $NO_x$ purifying performances.

What is claimed is:

1. A $NO_x$ storage-and-reduction catalyst for purifying an exhaust gas that is disposed in an exhaust gas of an oxygen-rich atmosphere made by burning an air-fuel mixture whose air-fuel ratio, A/F (air/fuel), is 18 or more, so that $NO_x$ in the exhaust gas is stored therein, and whose air-fuel ratio is perturbed from the stoichiometric point to a fuel-rich atmosphere periodically so that the $NO_x$ stored therein is released therefrom, thereby carrying out reducing and purifying, said catalyst being characterized by comprising: a support including rutile titania; a $NO_x$ storage material including at least one element selected from the group consisting of alkali metals, alkaline-earth metals and rare-earth elements and loaded on the support; and a noble metal loaded on the support, wherein at least a part of said rutile titania and said $NO_x$ storage material forms a composite oxide.

2. The catalyst for purifying an exhaust gas set forth in claim 1 characterized in that a particle diameter of said rutile titania is 15–100 nm.

3. The catalyst for purifying an exhaust gas set forth in claim 1 characterized in that a particle diameter of said composite oxide is 15–25 nm.

4. The catalyst for purifying an exhaust gas set forth in claim 1 characterized in that said $NO_x$ storage material and said rutile titania are composed in a molar ratio of $NO_x$ storage material/rutile titania=1/9–7/3.

5. A process for manufacturing a catalyst for purifying an exhaust gas characterized by comprising the steps of:
heat-treating by contacting a rutile titania source with a $NO_x$ storage material source including at least one element selected from the group consisting of alkali metals, alkaline-earth metal and rare-earth elements and by heat-treating them at 500–1,000° C., thereby forming a composite oxide powder of rutile titania and an $NO_x$ storage material;
mixing the composite oxide powder and an alumina powder, thereby making a support powder; and
loading a noble metal on the support powder.

6. The process for producing a catalyst for purifying an exhaust gas set forth in claim 5 characterized in that said heat-treating step is carried out by heating at a temperature of 600–800° C. for 1–3 hours.

7. A method for purifying an exhaust gas characterized in that a catalyst for purifying an exhaust gas, comprising a support including rutile titania, a $NO_x$ storage material including at least one element selected from the group consisting of alkali metals, alkaline-earth metals and rare-earth elements and loaded on the support, and a noble metal loaded on the support, is disposed in an exhaust gas of an oxygen-rich atmosphere made by burning an air-fuel mixture whose air-fuel ratio, A/F (air/fuel), is 18 or more, so that $NO_x$ in the exhaust gas are stored in the $NO_x$ storage material, and whose air-fuel ratio is varied from the stoichiometric point to a fuel-rich atmosphere periodically so that the $NO_x$ stored in the $NO_x$ storage material are released, thereby carrying out reducing and purifying, wherein at least part of said rutile titania and said $NO_x$ storage material forms a composite oxide.

8. A catalyst for purifying an exhaust gas characterized by comprising: a support including rutile titania; a $NO_x$ storage material including at least one element selected from the group consisting of alkali metals and alkaline-earth metals and loaded on the support; and a noble metal loaded on the support, wherein at least a part of said rutile titania and said $NO_x$ storage material forms a composite oxide.

9. The catalyst for purifying an exhaust gas set forth in claim 8 characterized in that a particle diameter of said rutile titania is 15–100 nm.

10. The catalyst for purifying an exhaust gas set forth in claim 8 characterized in that a particle diameter of said composite oxide is 15–25 nm.

11. The catalyst for purifying an exhaust gas set forth in claim 8 characterized in that a said $NO_x$ storage material and said rutile titania are composed in a molar ratio of $NO_x$ storage material/rutile titania=1/9–7/3.

12. A process for manufacturing a catalyst for purifying an exhaust gas characterized by comprising the steps of: heat-treating by contacting a rutile titania source with a $NO_x$ storage material source including at least one element selected from the group consisting of alkali metals and alkaline-earth metal and by heat-treating them at 500–1,000° C., thereby forming a composite oxide powder of rutile titania and an $NO_x$ storage material; mixing the composite oxide powder and an alumina powder, thereby making a support powder; and loading a noble metal on the support powder.

13. The process for producing a catalyst for purifying an exhaust gas set forth in claim 12 characterized in that said heat-treating step is carried out by heating at a temperature of 600–800° C. for 1–3 hours.

14. A method for purifying an exhaust gas characterized in that a catalyst for purifying an exhaust gas, comprising a support including rutile titania, a $NO_x$ storage material including at least one element selected from the group consisting of alkali metals and alkaline-earth metals and loaded on the support, and a noble metal loaded on the support, is disposed in an exhaust gas of an oxygen-rich atmosphere made by burning an air-fuel mixture whose air-fuel ratio, A/F (air/fuel), is 18 or more, so that $NO_x$ in the exhaust gas are stored in the $NO_x$ storage material, and whose air-fuel ratio is varied from the stoichiometric point to a fuel-rich atmosphere periodically so that the $NO_x$ stored in the $NO_x$ storage material are released, thereby carrying out reducing and purifying, wherein at least part of said rutile titania and said $NO_x$ storage material forms a composite oxide.

* * * * *